United States Patent [19]

Singh et al.

[11] Patent Number: 5,944,597

[45] Date of Patent: *Aug. 31, 1999

[54] METHOD FOR DEFATTING MEAT AND DEFATTED PRODUCTS

[75] Inventors: Prem S. Singh, Glenellyn; William A. Trujillo, Oakpark, both of Ill.

[73] Assignee: Swift-Eckrich, Inc., Downers Grove, Ill.

[ * ] Notice: This patent is subject to a terminal disclaimer.

[21] Appl. No.: 08/700,394

[22] PCT Filed: Feb. 16, 1995

[86] PCT No.: PCT/US95/01971

§ 371 Date: Nov. 4, 1996

§ 102(e) Date: Nov. 4, 1996

[87] PCT Pub. No.: WO95/23028

PCT Pub. Date: Aug. 31, 1995

[51] Int. Cl.⁶ .................................................. A22C 17/00
[52] U.S. Cl. ........................ 452/134; 426/480; 426/417
[58] Field of Search ........................... 452/134; 426/480, 426/417

[56] References Cited

U.S. PATENT DOCUMENTS

| | | | |
|---|---|---|---|
| 1,930,091 | 10/1933 | Halvorson et al. | 554/8 |
| 2,193,871 | 3/1940 | Hanno | 426/417 |
| 2,209,554 | 7/1940 | Bath | 494/4 |
| 2,388,284 | 11/1945 | Ratner | 554/8 |
| 2,497,367 | 2/1950 | Notevarp | 426/417 |
| 2,616,910 | 11/1952 | Pavia | 554/8 |
| 2,673,790 | 3/1954 | Illsley | 422/269 |
| 2,697,112 | 12/1954 | Kramer | 554/8 |
| 2,697,113 | 12/1954 | Kramer | 564/506 |
| 2,742,488 | 4/1956 | Dufault | 554/22 |
| 2,820,804 | 1/1958 | Gordon, Jr. | 554/23 |
| 2,832,634 | 4/1958 | Bergerson | 294/109 |
| 2,877,122 | 3/1959 | Hiller | 426/465 |
| 2,911,421 | 11/1959 | Greenfield | 554/22 |
| 2,984,622 | 5/1961 | Brunninghaus | 210/785 |
| 3,044,623 | 7/1962 | Behrens | 209/275 |
| 3,058,830 | 10/1962 | Christianson | 426/478 |
| 3,142,570 | 7/1964 | Thompson | 426/429 |
| 3,158,634 | 11/1964 | Marsh | 554/23 |
| 3,177,080 | 4/1965 | Alberts | 426/233 |
| 3,228,594 | 1/1966 | Amero | 494/23 |
| 3,261,546 | 7/1966 | Gruver, Jr. | 494/37 |
| 3,270,041 | 8/1966 | Artar et al. | 554/8 |
| 3,780,191 | 12/1973 | Langer et al. | 426/321 |
| 3,804,964 | 4/1974 | Hogstedt et al. | 426/473 |
| 3,959,518 | 5/1976 | Vincent | 426/643 |
| 4,098,095 | 7/1978 | Roth | 62/346 |
| 4,163,804 | 8/1979 | Meyer et al. | 426/315 |
| 4,168,418 | 9/1979 | Bird | 219/700 |
| 4,299,352 | 11/1981 | Erickson | 494/27 |
| 4,619,789 | 10/1986 | Strop et al. | 554/8 |
| 4,778,682 | 10/1988 | Chapman | 426/248 |
| 5,041,055 | 8/1991 | Roth | 452/140 |
| 5,282,780 | 2/1994 | Epper et al. | 494/1 |
| 5,382,444 | 1/1995 | Roehrig et al. | 426/646 |
| 5,520,933 | 5/1996 | Yoshida et al. | 426/7 |

FOREIGN PATENT DOCUMENTS

| | | |
|---|---|---|
| 239650 | 7/1962 | Australia . |
| 405953 | 9/1970 | Australia . |
| 417271 | 9/1971 | Australia . |
| 1046642 | 10/1966 | Denmark . |
| 0048771A1 | 9/1980 | European Pat. Off. . |
| 2816521A1 | 10/1979 | Germany . |
| 4104482A1 | 8/1992 | Germany . |
| 2260684 | 10/1991 | United Kingdom . |
| 2264220 | 1/1993 | United Kingdom . |
| WO8503415 | 2/1985 | WIPO . |
| WO8700733 | 2/1987 | WIPO . |
| WO9000863 | 2/1990 | WIPO . |

OTHER PUBLICATIONS

Advertisement, *Turn DAF Skimmings Problems into Profits*, Alfa–Laval, Meat & Poultry, Jan. 1992.

Armonioso, U. *La Moderna Tecnica della Lavorazione dei Grassi animali e Vegetali*, Alfa Laval S.p.A., Milano, La Revista Italiana Delle sostanze Grasse, vol. XIVIII, Sep. 1971.

Article, *Single–pass Centrifuge Produces Three Different Chicken By–products*, Field Report, Food Engineering Int'l, Jul. 1978.

Claus, James R., *Fat Reduction in Comminuted Meat Systems*, Processed Meats, Reciprocal Meat Conference proceedings, vol. 44, 1991.

Dhillon, A. S. and A. J. Maurer, *Utilization of mechanically deboned Chicken Meat in the Formulation of Summer Sausages*, Poultry Science 54: 1164–1174, 1975.

Gabrowski, P., *Einfluss des Synthetischen Lysins auf die Qualitat des Schweinefleisches Zur Herstellung con Konserven und Halbkonserven*, Technologisches Forschungsinstitut fur Fleischwirtschaft, Sofia Bulgarian, undated.

Hermann, Dr. Ing. H., Dipl–Ing. W. Nitzsche, *Maschinelle Trennung von Fleisch Und Knochen*, Fleisch 29 (1975, H.8.

Kijowski, Jacek, *Attempts at Obtaining the West Concertrate of Myofibrils From Chicken Breast and Mechanically Deboned Poultry and Its Functional Properties*, Acta Alimentaria Plonica, vol. XV (XXXIX) No. 4), undated.

Kumar, Sushil and J. Wismer Pedersen, *Methods of Improving Mechanically Deboned Poultry Meat Quality—A Review*, Avian Research, 1983, 67(3): 108–115.

(List continued on next page.)

Primary Examiner—Scott W. Houtteman
Attorney, Agent, or Firm—Pretty, Schroeder & Poplawski

[57] ABSTRACT

In accordance with the present invention, there is provided an improved decanter centrifuge and improved methods for producing defatted meat having substantially the same functionality, protein profile, vitamin profile, color, texture and water content as the raw meat starting material. A defatted meat and food products containing the defatted meat are also provided.

14 Claims, 1 Drawing Sheet

OTHER PUBLICATIONS

Lawrence, R. A. and Jelen, P., *Alkaline Extraction of Protein From Residues of Mechanical Separation of Poultry,* Research in Food Science and Nutrition vol. 2, Basic Studies in Food Science, Proceedings of the Sixth International Congress of Food Science and Technology Duboin, Sep. 18–23, 1983.

Maurer, A. J. and J. W. Goblee, *Partial Dewatering of Mechanically Debvoned Poultry Meat,* 1981 Poultrey Science 60:750–760.

Mccurdy, Sandra M., Pavel Jelen and Darrell F. Wood, *Protein Recovery from Mechanically Separated Pork Residue,* Con. Inst. Food Sci. Technol., J. vol. 20, No. 1, pp. 53–55 1987.

Marsden, James L., *Update: Scientific/Technical Issues,* Reciprocal meat Conference Proceedings, vol. 43, 1990.

Marsden, James L., *Red Meat Recovery System by Physical Separation,* American Meat Science Association, Proceedings 46th Annual Reciprocal Meat Conference, Jun. 20–23, 1993.

McCutcheon, John and Daniel L. Engeljohn, *Products from Lean Recovery,* American Meat Science Association, Proceedings 46th Annual Reciprocal Meat Conference, Jun. 20–23, 1993.

Pearson, A. M., A. Asghar, J. I. Gray, A. M. Booren, *Impact of Fat Reduction on Palatability and Consumer Acceptance of Processed Meat,* American Meat Science Association, Proceedings 46th Annual Reciprocal Meat Conference, Jun. 20–23, 1993.

Richardson, R. I. and J. M. Jones, *the Effects of Salt Concentration and pH upon Water–Binding, Water–HIding and Protein Extractability of Turkey Meat,* International Journal of Food Science and Technology (1987) 22, 683–692.

Scientist, G. S. Paddy, *Mechanical Deboning—A Way to Full Utilization of Poultry Meat,* Poultry Guide, Jul., 1983, 92–95.

Schmidhofer, Th., *Zur Beurteilung von Speck Hinsichtlich Seiner Eignung fur die Fleischwarenherstellung,* and translation: *With Regard to the Evaluation of Bacon Fat Related to Its Suitability for the Meat Products Industry,* Proc. Eur Meeting of Meat Research Worker, 15:405–8, 1969.

Shand, Phyllis J., Glenn R. Schmidt, Roger W. Mandigo, and James R. Clause, *New Technology for Low–Fat Meat Products,* Reciprocal Meat Conference Proceedings, vol. 43, 1990., 37–52.

Swan, J. E., *Low Temperature Rendering of Animal Materials and Its Application to Reducing Fat in Edible Meat,* American Oil Chemists' Society, Proceedings World Conference on Emerging Technologies in the Fats and Oils Industry, Meat Industry Research Institute of New Zealand, Hamilton, New Zealand, Sep. 30, 80, 373–376.

Swan, J. E. and L. Catcheside, *Defatting Mutton by Low Temperature Thermal Processing,* Meat Industry Research Institute of New Zealand Inc., Apr. 1984.

Unknown, *Altering Fat Composition of Red Meat and Fish Products,* Food Fats and Health, undated.

Willimsen, Bernardus J.J., *Separation of Residual Meat Attached to Bones,* Reciprocal Meat Conference Proceedings, vol. 46, 1993, 39–43.

Russian article, CFE–4 Tipusu Titan Zsirolvaszto–vonal Muszaki Tovabbfejlesztese, Husipar, pp. 117–125, undated.

Russian article, Myasnaya Industriya SSSR, No. 5:27–29, 19975, pp. 27–29, undated.

Abstract, Database WPI, weel 1592 May 27, 1992, Derwent Publications Ltd., London, GB AN 92–122268 & SU–A 1,650,254, Kiev Food Ind. Tech) May 23, 1991.

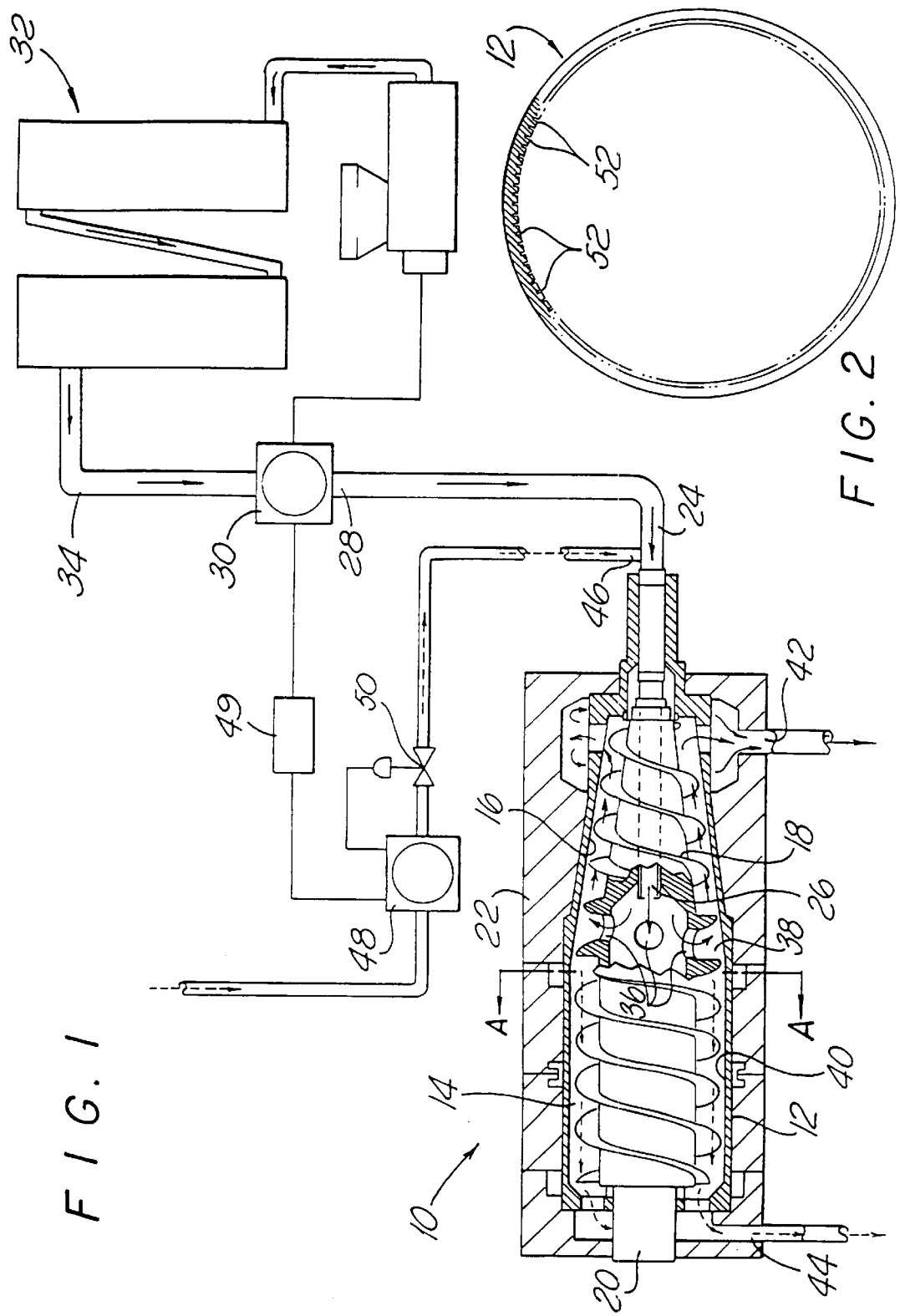

METHOD FOR DEFATTING MEAT AND DEFATTED PRODUCTS

BACKGROUND OF THE INVENTION

1. Field of the Invention

The present invention relates to the mechanical arts. In particular, it relates to an apparatus and process for defatting meat, the resulting defatted meat, and products containing the resulting defatted meat.

2. Discussion of the Related Art

All meats contain protein (muscle), fat and water. The fat is found not only in cells forming fatty or adipose tissues, but in cells interspersed between muscle tissues. The composition, physical and chemical properties of the fat differs significantly depending on the location of the cells.

In recent years, a great deal of attention has been focused on the dangers of diets high in fat, especially as high fat diets have been implicated in an increased incidence of diseases of blood vessels, such as coronary heart disease and arteriosclerosis. As a consequence of these studies and concerns, the medical profession has been advising that consumption of fat be reduced. One way this can be accomplished is by eating meats that have been processed, so that they contain little, if any, fat.

Processes for removing fat from meat can be viewed as involving two steps. First, a primarily fat-containing fraction must be freed from the meat-containing fraction. Second, the two fractions must be separated from one another.

In the simplest form of fat removal—manually cutting fat from the meat—the two steps are combined. Fat-containing tissue is cut from meat-containing tissue and the resulting fractions are separated by what is essentially the same motion. Unfortunately, manually cutting fat from red meat, for example, is effective in reducing the fat content of the remaining meat fraction to no lower than about five percent. Further, skilled workers and much time are needed to cut the meat, thus making the process expensive.

In an attempt to reduce the fat content of meat other processes have been suggested. These processes typically employ one or more of the following approaches. First, the fat can be freed from meat by mechanical techniques, such as by the use of a grinder, a crusher, a press, a comminuter, or a microcomminuter. These procedures have been employed with or without accompanying high temperatures. Second, physical extraction techniques, such as the use of heat, and reaction of gases with meats, including fluid extraction, have been applied to remove fat from meat. Third, fat has been removed employing chemical extraction techniques, such as the use of chemical reagents, including acids, alkalis, and the like.

Unfortunately, these techniques all suffer from numerous drawbacks. They generally have a detrimental impact on the functionality of the meat or alter the meat's protein profile, vitamin profile, its color, its texture and/or its water content. For example, high temperatures denature meat. The use of diluents, such as water, can leach water-soluble proteins and vitamins from the meat and can increase the moisture content of the defatted product. Additionally, when diluents are used with micro-comminution of meat, the functional properties of the resulting product are adversely affected. And the acid or alkaline treatment of meat facilitates the binding of anions or cations, respectively, to the protein, thereby adversely affecting the meat's functional properties, particularly its solubility characteristics. Consequently, it is a desideratum to defat meat using the mildest possible conditions, i.e., using minimal grinding, little if any added water or added chemical reagents and mild temperatures.

Moreover, it is often the subsequent separation step that is critical to the success or failure of a defatting process. Even if a substantial amount of fat is initially liberated from the meat, unless the fat is effectively separated from the meat, the process will not be a success. For example, even if the proper choice of conditions for grinding or comminuting meat produces a substantial fat-containing fraction, conventional devices, such as conventional decanter centrifuges, are not completely effective in separating the resulting fractions. Accordingly, it is also a desideratum to maximize the effectiveness of the separation fat-containing and meat-containing fractions.

There has also been a long felt need for lowering the cholesterol contained in meat products. Accordingly, it is a desideratum to employ an apparatus and process that not only reduces the level of fat, but also significantly reduces the level of cholesterol in meat.

OBJECTS OF THE INVENTION

It is, therefore, an object of the invention to provide an apparatus for producing a low-fat, reduced cholesterol, low-cost meat product.

It is another object of the invention to provide an apparatus for separating both adipose and intramuscular fat from meat.

It is a further object of the invention to provide a method for defatting meat that does not require chemical additives, catalysts, acids/bases, or pH adjustment.

It is another object of the invention to provide a defatted meat having the protein profile vitamin profile, fat composition profile, and moisture content substantially unchanged relative to the non-defatted raw starting material.

It is yet a further object of the invention to provide a defatted meat having functional properties equal to or superior to undefatted raw material.

It is yet a further object of the invention to provide an inexpensive defatted meat that can be substituted for substantially more expensive conventional low-fat meats when preparing meat-based food products.

These and other objects of the invention will become apparent to those of skill in the art upon review of the specification and appended claims.

SUMMARY OF THE INVENTION

Now in accordance with the invention there has been found an improved decanter centrifuge and method for producing defatted meat having substantially the same functionality, protein profile, vitamin profile, color, texture and water content as the raw meat starting material. The defatted meat, however, contains from 0% to 10% fat and has a substantially reduced level of cholesterol.

The decanter centrifuge has a hollow, centrifugal rotor with a longitudinal axis of rotation a. The centrifugal rotor defines a generally cylindrical bowl tapered at one end to form a beach. The centrifuge also has a feed tube for introducing starting material into a delivery zone in the interior of the cylindrical bowl and a fluid inlet tube for proportionately metering a fluid into the feed tube. A screw conveyor, is disposed in the cylindrical bowl to cause a substantially solid fraction to be discharged at at least one solid discharge port located at the tapered end of the rotor and a substantially liquid fraction to be discharged at at least one liquid discharge port located at the opposing end of the rotor.

In accordance with the present invention, a method is provided for the centrifugal separation of a starting material into a substantially solid fraction and a substantially liquid fraction. The method includes the steps of feeding the starting material into a decanter centrifuge through a feed tube. Simultaneously, a liquid, such as water, is proportionately metered into the feed material through a fluid inlet tube in communication with the feed tube. Preferably, although not required, a fluid metering device operatively connected to the fluid inlet tube controls the amount of liquid metered into the feed material. By applying centrifugal force to the contents of the cylindrical bowl, the feed material is separated into a substantially solid fraction and a substantially liquid fraction.

In some embodiments of the method in accordance with the invention, the starting material is raw meat and the resulting solid fraction is defatted meat which has not been denatured by the defatting process. The raw meat starting material, preferably deboned meat, is pumped through a heating means to adjust its temperature, preferably, up to the live body temperature of the corresponding species. In preferred embodiments, the raw meat is pumped in the substantial absence of added liquid. The temperature adjusted meat material is then fed to a decanter centrifuge maintained under suitable conditions to form a substantially solid layer of defatted meat, an intermediate boundary layer, and a substantially liquid layer of fat. Simultaneously, a liquid is metered into the meat feed. The liquid is added in an amount proportionate to the amount of the meat fed, so as to drive the boundary layer from the centrifuge along with the substantially liquid fat layer, thereby effectively separating the defatted meat.

In accordance with a further embodiment of the invention, there is provided a defatted meat, prepared from a raw meat starting material. The defatted meat has a protein profile substantially equivalent to the protein profile of the starting material, a vitamin profile substantially equivalent to the vitamin profile of the starting material, and a proportional fat composition substantially equivalent to the fat composition of the starting material. Further, the defatted meat is substantially free of denatured protein and has improved functional properties compared to the functional properties of the starting material, substantially equivalent water holding capacity relative to the water holding capacity of the starting material, and substantially equivalent moisture content relative to the moisture content of the starting material. Still further, the defatted meat is substantially reduced in cholesterol when compared with the starting material.

BRIEF DESCRIPTION OF THE DRAWINGS

FIG. 1 is an axial, partial sectional view of a decanter centrifuge modified in accordance with the invention along with associated elements.

FIG. 2 is a cross-sectional view of a portion of the decanter centrifuge viewed along line A—A of FIG. 1.

DETAILED DESCRIPTION OF THE PREFERRED EMBODIMENTS

With reference now to the exemplary drawings and particularly to FIG. 1, there is shown a decanter centrifuge 10 modified in accordance with the invention for separating a substantially solid fraction from a substantially liquid fraction. The centrifuge includes a centrifugal rotor 12 having a longitudinal axis of rotation $\alpha$. The rotor defines a generally cylindrical bowl 14, one end of which is tapered to form a beach 16.

A screw conveyor 18 having a hollow, longitudinal core 20 is located in the cylindrical bowl 14. The screw conveyor has the same axis of rotation as the rotor 12 and rotates in the same direction, but at a different rate. The details of the means for driving the rotor and the screw conveyor are well known in the art and do not form part of the invention. A housing 22 surrounds the rotor, the screw conveyor and associated parts.

A feed tube 24 passes through the beach 16 and one end 26 of the feed tube terminates inside the hollow core 20. Preferably, the other end 28 is operatively connected to a metering device 30, so that the feed tube introduces the starting material to be separated into solid and liquid fractions into the cylindrical bowl in a controlled manner. Suitable metering devices are known in the art and include electromagnetic flowmeters, such as those commercially available from Johnson-Yokogawa, and the like.

A starting material is pumped from a heat exchanger 32 through a conduit 34, through the metering device 30 into the feed tube 24 and then introduced into the centrifuge 10 where it is subjected to centrifugal forces. The feed tube discharges the starting material at the end 26 proximate to perforations 36 in the screw conveyor 18. The centrifugal forces cause the starting material to be thrust through the perforations and into a delivery zone 38 in the interior of the cylindrical bowl 14. In the cylindrical bowl, the centrifugal forces cause a dense substantially solid fraction to form a layer on the inner wall 40 of the bowl and a less dense substantially liquid layer to form away from the wall.

The screw conveyor 18 moves the substantially solid layer longitudinally along the inner wall 40 and up the beach 16, thereby separating the substantially solid layer from the substantially liquid layer. The substantially solid layer is then discharged from the centrifuge through solid discharge ports 42. Because the substantially liquid fraction cannot travel up the beach to the solid discharge ports, it is discharged through liquid discharge ports 44 located at the opposite end of the bowl.

Suitable decanter centrifuges, that can be modified according to the invention, are well-known in the art and include those produced by Alfa Laval, e.g., Alfa-Laval's Model Nos. NX 400 Series, NX 309B-31, AVNX 309B-31G, and the like. The presently preferred decanter centrifuge for use herein is the Alfa Laval, Model# NX 400 (Alfa Laval, Denmark).

Now in accordance with the invention, such centrifuges are modified by providing a fluid inlet tube 46 terminating in the feed tube 24, proximate to where the feed tube enters the cylindrical bowl 14. In a preferred embodiment, operatively connected to the fluid inlet tube is a metering device 48 which monitors and controls the amount of water added to the starting material feed.

Any system capable of precisely metering water at relatively slow flow rates can be used in accordance with the invention. Suitable system include low-flow metering devices, such as those commercially available from Key Instruments, Honeywell, Foxboro Instruments Inc., or electromagnetic flowmeters, such as those commercially available from Johnson-Yokogawa, and the like.

In the embodiment shown in FIG. 1, the starting material-metering device 30 generates a signal proportionate to the amount of starting material being introduced into the feed tube 16. The signal is communicated to the fluid-metering device 48 using well-known means 49. The fluid-metering device then regulates the flow of water through an electronic or pneumatic valve 50 to maintain a predetermined ratio of the starting material to the water introduced into the feed tube of the centrifuge.

In those embodiments where the starting material is raw meat, the proportions of starting material to water introduced into the centrifuge typically range in an amount from about 0.05 up to about 0.5 gallons liquid/10 pounds starting material feed. When the starting meat material is poultry (such as turkey and/or chicken) the proportions of liquid to raw meat introduced into the centrifuge is preferably an amount of about 0.2 gallons water/10 pounds incoming raw material. The skilled artisan can readily adjust the ratio of starting material to water by monitoring the fat content of the defatted product.

As best seen in FIG. 2, in one embodiment of the invention, the rotor 12 has longitudinal grooves 40 machined into its inner surface. The grooves are machined into both the cylindrical bowl 14 and the beach 16. In the cylindrical bowl, the grooves are machined in at least the one-third of the length of the cylinder wall 40 which is nearest the beach 16. However, grooves spanning the entire length of the cylindrical section are also contemplated for use herein. Typically, the groves have a width of about one-eighth inch and are spaced about one inch from one another. The grooves create friction in the path of the outer moving meat layer during centrifugation. The friction improves the contact between the meat layer and the surface of the centrifuge bowl which enhances the separation of the meat layer from the boundary and fat layers.

In accordance with certain embodiments of the present invention, it is contemplated that raw meat from any animal source can be used as the initial material to be processed. The raw meat can come from mammals, reptiles, fish and birds. For example, meats contemplated for use herein include mechanically deboned poultry meat (MDPM), such as mechanically deboned turkey (MDT) and mechanically deboned turkey meat (MDTM), chicken, duck, goose, and any kind of domestic or wild fowl; mechanically deboned red meat (MDRM), such as mechanically deboned beef (MDB), beef, veal, and all meat products from cattle; lamb, mutton, and all meat products from sheep; pork, ham, and all meat products from pigs and swine; and the like. Techniques for mechanically deboning meats are well known and such meats are preferred.

It is not required that the raw meat be only of one kind or obtained from only one source; to the contrary, many recipes and human needs require mixtures of different kinds of meat from various sources. Accordingly, neither the nature, source, type, nor quality of meat is deemed to be a relevant or restrictive factor for purposes of practicing the present invention. However, in some cases, it may be desirable to employ starting meat material having an initial fat content of 15–20% or less, which can be obtained by selecting appropriate starting materials.

Raw meat employed in the practice of the present invention need not be fresh meat as such; the techniques of freezing, cold storage, and other conventional means for preserving meat without cooking are all deemed to provide meat in a form which is useful for treatment by the present invention. It is a distinct advantage of the method, that it can be run continuously beginning with relatively large amounts, e.g., at least about 2000 pounds/hour of raw meat. The starting material may be comprised of meat obtained from animals having differing fat contents, slaughtered at different times, and preserved under different conditions.

It is another distinct advantage, that the size of the meat pieces is not critical. All that is necessary is that they be sufficiently reduced in size to rupture an effective amount of their fat cells. The meat pieces should not be so reduced in size, however, that the fat becomes emulsified, because of the difficulties in subsequently separating emulsified fat from the meat fraction and because such highly comminuted products do not have the desirable coarse texture of the raw meat starting material. The desired degree of fragmentation will be different for meat obtained from different species. Target sizes for the fragmented meat particles are generally in the range of about 0.5–5 mm.

So, for example, when mechanically deboned meat is used as the starting material, it does not have to be further reduced in size for the defatted product to be useful in some applications. In other applications and with other, larger starting materials, the size is reduced by chopping, shredding, or by any other process which provides fragmented meat particles having the desired size.

The raw meat starting material is typically collected from various sources and mixed to form one homogeneous mass. This provides a consistent temperature and uniform fat content before raw meat starting material is further processed.

The raw meat starting material is then pumped through a heating means (e.g., a heat exchanger). Scraped surface heat exchangers are preferred in order to heat the starting material to the live body temperature of the corresponding species. Suitable heat exchangers are well-known in the art, and include those available from Alfa Laval, Cherry Burrel, Groen, and APV Company.

It is a distinct advantage of the invention that the meat is defatted in the substantial absence of water or other reagents. Neither water nor other reagents need to be added to condition or otherwise treat the raw meat starting material prior to delivering the raw meat to the decanter centrifuge. Indeed, it is presently preferred that raw meat starting material be subjected to no conditioning or other treatment by the addition of chemical reagents, catalysts, water, acids, pH adjustment, diluents, extraction fluids, or the like. If desired and feasible, these treatments may be employed, however.

The meat is heated to a temperature sufficient to free the fat without denaturing the protein in the meat fraction. This temperature will typically fall within the range of about 85° to no more than about 120° F., preferably from about 90° to about 110° F.

In the most preferred embodiments, the temperature is substantially the same as the live body temperature of the corresponding animal species. For example, when turkey or beef meat is being processed, the meat is preferably heated to a temperature in the range of about 97–108° F. When turkey meat is being processed, the meat is preferably heated to a temperature in the range of about 97–102° F. When beef is being processed, the meat is preferably heated to a temperature in the range of about 100–108° F.

After the temperature of the raw meat material has been equilibrated to the desired temperature, the raw meat material is continuously fed into the decanter centrifuge 10 through the feed tube 24 and into the cylindrical bowl 14. Suitable g-forces for use when operating the centrifuge are in the range of about 2,000–20,000, preferably in the range of about 2,500–10,000. A g-force of about 3,000–5,000 is especially preferred.

The forces created by the decanter centrifuge cause three layers to form along the inner wall 40. A layer containing a substantially solid meat fraction is deposited on the wall of the cylindrical bowl. A layer containing a substantially liquid fat fraction forms furthest from the wall. And between the meat and fat layers is formed a boundary layer containing a mixture of fine muscle tissues, unruptured cells containing fat, membranes of ruptured cells (also containing some fat), fat droplets and fine meat fibers. In order to obtain the invention defatted meat, it is important to separate the fat-containing boundary layer from the meat layer. It has also been found that removal of the boundary layer from the meat results in meat having the desired texture and functional properties, such as substantially the same water holding capacity as the starting material, and the like.

Prior to the invention method, it was difficult to separate this fat-containing boundary layer from the meat layer, because the specific gravity of the boundary layer is close to that of the meat layer, and is distinct from the specific gravity of the fat layer. Consequently, it was difficult to obtain defatted meat that did not contain these undesirable residual fat-containing particles.

In accordance with the present invention, a solution for separating the meat and boundary layers is provided, thereby producing a very low fat or no fat meat. Separation is accomplished by introducing, through the fluid inlet tube, a proportionately small metered amount of water relative to the amount of the raw meat feed. The water creates sufficient hydrostatic pressure so that the fat and boundary layers are separated from the meat layer resulting in the continuous and highly-effective removal of fat and undesired meat particles from the meat fraction. The defatted meat is recovered and chilled using methods well-known in the art.

In the presence of a liquid, such as water, the behavior of the boundary layer can be expressed by Stoke's Law:

$$Dpc = \frac{9Q\mu S}{(P_p - P)VW^2 r}$$

where,
Dpc=critical diameter,
Q=Flow rate of incoming raw material,
$\mu$=Liquid viscosity,
S=Liquid thickness in bowl of decanter,
$P_p$=Density of solid fraction,
P=Density of liquid fraction,
V=Volume of liquid held in the bowl of decanter,
W=Rate of rotation of decanter bowl (radian/sec), and
r=Radial distance from center to the wall of the rotating bowl in a decanter.

Any particle having a diameter greater than the critical diameter will be forced into the solid meat fraction, while any particle having a diameter less than critical diameter will be forced into, the liquid fat fraction. Particles having a diameter equal to critical diameter can go in either fraction.

By maintaining each variable at a predetermined level, the density of the liquid fraction can be controlled when water is proportionately metered into the cylindrical bowl. Since fat is lighter than water, the addition of water effectively increases the density of the liquid fraction, thereby decreasing the denominator of the above formula, which effectively increases the value of Dpc. In other words, the critical diameter is increased. As a result, of the increased critical diameter, the particles in the boundary layer are driven off with the substantially liquid fat fraction. The overall physical effect of precisely metering the water in proportion to the incoming starting meat material in the decanter centrifuge is that a defatted meat composition of desired physical characteristics remains in the substantially solid fraction of the decanter centrifuge, leaving the fat, fatty tissues, moisture and some undesirable meat particles in the substantially liquid fraction.

It is important that the decanter centrifuge 10 is designed so the water is metered into the raw meat feed as close to the delivery zone 38 as is practical, in order to minimize the interaction between the added water and the meat fraction. This eliminates any adverse effect the water might have on the meat fraction such as the leaching out of water-soluble proteins or vitamins. Thus, the final meat composition is not adulterated relative to the untreated starting material, which results in the novel characteristics of the invention defatted meat.

The amount of water introduced into the centrifuge in connection with a specific application depends on a number of factors including the size and make of the centrifuge, as well as the flow rate of the starting material. The flow rate will be readily determinable for any application without undue experimentation, for example, simply by monitoring the composition of the end products. In some embodiments, the ratio of water to raw meat metered into the centrifuge ranges from about 0.01 up to about 0.9 gallons water/10 pounds incoming raw material, more preferably about 0.05 up to about 0.5 gallons water/10 pounds incoming raw material. When the starting meat material is poultry (such as turkey and/or chicken) the ratio of water to raw meat introduced into the centrifuge is preferably about 0.2 gallons water/10 pounds incoming raw material.

The temperature of the water being metered into the centrifuge preferably corresponds to at least the temperature of the incoming starting meat material. In some embodiments, it may be desirable to employ metered water having even higher temperatures to affect the desired separation.

Those of skill in the art will recognize that inert substances, other than water, that will not mix or react with the meat layer in the centrifuge can be substituted for water to create sufficient hydrostatic pressure to separate the fat and boundary layers from the meat layer. Exemplary inert substances are described, for example, in U.S. Pat. No. 3,780,191.

Those of skill in the art will also appreciate that the apparatus and process can be run continuously and on an automated in-line format. However, it is preferable to run the process in approximately six hour intervals, with appropriate cleaning of the centrifuge occurring between such intervals to control the growth of microorganisms. The invention apparatus and process are particularly amenable to automated running by employing suitable computing means.

The resulting defatted meat contains from 0% up to about 10% fat content, preferably 0% up to about 5% fat content, with less than about 2% fat content being especially preferred. It also contains substantially less cholesterol than the raw meat starting material and has the desirable coarse texture and appearance of fresh meat.

The droplets of fat and the particulate fat and muscle tissues contained in the various fractions can be microscopically examined employing polarized light microscopy using a combination of plane polarized light and crossed polars. Visualization in this manner indicates that the defatted meat fraction has undergone a significant increase in muscle fiber and concurrent reduction in fat droplets and fat particles.

Additionally, because of the moderate reaction conditions the resulting defatted meat has a protein profile substantially equivalent to the protein profile of the raw meat starting material, a vitamin profile substantially equivalent to the vitamin profile of the starting material, and a proportional fat composition substantially equivalent to the fat composition of the raw meat starting material. Of further importance, the defatted meat is substantially free of denatured protein, has substantially equivalent water holding capacity relative to the water holding capacity of the raw meat starting material, and has substantially equivalent moisture content relative to the moisture content of the starting material. For example, 1 gram of the defatted turkey composition prepared as described in Example 1 holds 0.9 grams of water. Still further, the defatted meat has substantially improved functional properties compared to the functional properties of the starting material.

As used herein, "protein profile" refers to the relative composition of amino acids that are contained in the various proteins within the meat (see, e.g., Example 1 and Table 2). "Vitamin profile" refers to the relative composition of vitamins that are contained in the defatted meat (see, e.g., Example 1 and Table 4). "Proportional fat composition" refers to the relative composition of fat that is contained with the meat. For example, meat fat typically comprises saturated, mono-unsaturated and poly-unsaturated fat. The invention method is effective in removing both adipose and intramuscular fat from the meat fraction, thus leaving the proportion of saturated, mono-unsaturated and unsaturated fat substantially unchanged relative to the respective levels in deboned, uncomminuted raw meat material (see, e.g., Example 1 and Table 3).

As used herein, "substantially free of denatured protein" refers to meat isolated by the method described herein. Such meat does not contain a significant amount of denatured protein that typically occurs when deboned animal meat is subjected to temperatures above 110–120° F. In other words, the proteins in the meat produced herein have substantially the same tertiary structures as the proteins in the respective deboned raw meat starting material.

The improved functional properties of the defatted meat include, for example, improved binding characteristics, improved flavor and texture, and increased fiber content. These properties are all useful in the formulation and further processing of meat products.

The defatted meat is useful in any composition that requires a ow fat, high quality protein source. For example, the invention defatted meat can be used in a variety of food products, such as processed meat, poultry, or fish products (e.g., hot dogs, dry or semi-dry sausages, health foods, snack foods (e.g., baked high protein-type snack products), protein drinks, and the like. The food products can be prepared by methods well-known in the art (see, e.g., U.S. Pat. No. 4,844,922; U.S. Pat. No. 4,876,103; U.S. Pat. No. 4,504,515; and the like).

It is important to design a product formula, so that the protein to water ratio gives a desirable yield and/or texture, as well as provides other required characteristics of finished product. The protein to water ratios obtainable with the defatted meats in accordance with the invention are as good as the ratios obtainable with the expensive lean meats produced by known processes. Consequently, it is possible to replace either part or all of full-fat meats or expensive lean meats in a product formula with the low cost, low fat, invention defatted meat, and still produce a composition having good meat functionality.

It is noteworthy that finished meat products containing the defatted meat suffer no more processing losses in cook shrink and slicing yield than products made from leaner (untreated) high-cost raw materials having the same fat content (i.e. % of fat) as the low-cost defatted meat of the invention. In addition, the defatted meat, when formulated and further processed into finished meat products, has a substantially similar color when compared to meat products from raw meat materials of the same species which have not been defatted. Also, invention defatted meats, when formulated and further processed into finished meat products, result in meat-based products with substantially similar sensory profile and organoleptic properties compared to meat products made with conventional full-fat or low fat high cost raw materials.

Each of the U.S. patents referenced herein are hereby expressly incorporated by reference. The invention will now be described in greater detail by reference to the following non-limiting examples.

EXAMPLE 1

Two thousand pounds of mechanically deboned turkey meat was produced using a U.S.D.A. approved deboning machine. The temperature of this mechanically deboned turkey meat (MDTM) was adjusted using a scraped surface heat exchanger to about 97–100° F. (i.e., within the normal body temperature range of live turkey). The temperature adjusted raw material was pumped in a continuous manner to a decanter centrifuge (Alfa Laval, Denmark, Model #NX 309B-31) operating in a range of 2000–4000 g force. Water was metered into the feed tube of the decanter centrifuge at a flow rate of 0.2 gal/10 lbs. raw material/minute. The temperature of the metered water was adjusted to match the temperature of the ingoing raw material.

Fat, fatty tissues, water and some meat particles were removed from the meat fraction. Table 1 compares a control, Sample A (raw MDTM, not defatted), with two samples of the resulting defatted meat, Samples B and C. As can be seen, the fat content of the defatted meat prepared as described herein was only about 1%.

Additionally, the absolute water content of decanted defatted meat did not increase above the natural moisture already present in raw material. Accordingly, there was no dilution of raw material. This shows that fat reduction was achieved purely on the basis of fat removal, rather than on the basis of dilution with water in the resulting fat reduced meat.

TABLE 1

| Product Description | % Prot | % Fat | % MDis | % Ash | % Carbo | Kcal/ 100 g | % Salt | Na+ mg/ 100 g | Pot mg/ 100 g | Cal mg/ 100 g | Iron mg/ 100 g | % Dex | % Suc | % Fruc | Chol mg/ 100 g |
|---|---|---|---|---|---|---|---|---|---|---|---|---|---|---|---|
| Sample A | 16.8 | 9.5 | 73.4 | 1.1 | 0.0 | 153 | 0.16 | 76 | 181 | 111 | 1.54 | 0 | 0 | 0 | 83.6 |
| Sample B | 18.6 | 0.8 | 80.3 | 1.1 | 0.0 | 82 | 0.09 | 71 | 157 | 127 | 1.36 | 0 | 0 | 0 | 61.9 |
| Sample C | 19.4 | 1.1 | 79.2 | 1.2 | 0.0 | 88 | 0.09 | 60 | 131 | 214 | 1.29 | 0 | 0 | 0 | 60.5 |

Samples of A, B and C of were collected, chilled immediately by using solid $CO_2$ and analyzed for amino acid profile using the protein hydrolysate method. The amino acid profile is presented in Table 2.

TABLE 2

| | % | | |
|---|---|---|---|
| | Sample A | Sample B | Sample C |
| Aspartic Acid | 9.42 | 9.27 | 5.92 |
| Glutamic Acid | 14.73 | 15.12 | 14.91 |
| Hydroxyproline | 1.29 | 1.38 | 1.83 |
| Serine | 3.82 | 3.59 | 3.66 |
| Glycine | 5.37 | 5.38 | 5.73 |
| Histine | 2.86 | 3.64 | 3.86 |
| Arginine | 6.05 | 6.21 | 6.17 |
| Threonine | 4.07 | 4.06 | 3.96 |
| Alanine | 5.82 | 5.74 | 5.77 |
| Proline | 8.63 | 9.87 | 9.48 |
| Tyrosine | 2.96 | 2.87 | 2.79 |
| Valine | 4.95 | 4.84 | 4.63 |
| Methionine | 2.48 | 2.38 | 2.31 |
| Cysteine | 1.00 | 0.95 | 0.88 |
| Isoleucine | 5.45 | 5.43 | 5.28 |
| Leucine | 8.60 | 8.85 | 8.39 |
| Phenylalanine | 4.02 | 3.97 | 3.95 |
| Tryptophan | 1.33 | 1.15 | 1.26 |
| Lysine | 7.13 | 5.60 | 8.22 |
| Total % | 100.0 | 100.0 | 100.0 |

Table 2. indicates that the amino acid content of the defatted meat was essentially the same as the raw meat starting material.

The fat profile of samples A, B and C was also analyzed. The resulting data is presented in Table 3.

TABLE 3

| Sample | % Total Saturates | % Monounsat. | % Polyunsat. |
|---|---|---|---|
| A | 3.3 | 3.3 | 2.9 |
| B | 0.3 | 0.3 | 0.3 |
| C | 0.4 | 0.4 | 0.4 |

The data from Table 3 indicates that the proportional distribution of saturated, mono-unsaturated and poly-unsaturated fats in the defatted meat remained substantially the same as the proportional distribution in the raw meat starting material.

The samples were analyzed for vitamin distribution. The resulting data is presented in Table 4.

TABLE 4

| Sample | Thiamine mg/100 g | Riboflavin mg/100 g | Niacin mg/100 g |
|---|---|---|---|
| A | 0.04 | 0.18 | 4.2 |
| B | 0.04 | 0.16 | 4.1 |
| C | 0.04 | 0.14 | 2.9 |

The data from Table 4 indicates that the vitamin profile of two samples of defatted meat, Samples B and C, remained substantially the same as the vitamin profile of the raw meat starting material, Sample A.

EXAMPLE 2

The procedure in Example 1 was repeated except mechanically deboned turkey (MDT) was used rather than MDTM. The distinction between MDTM and MDT is that MDT can include turkey skin but MDTM cannot. The defatted meat processed in this manner had a fat content from 0.2 to less than 2%.

EXAMPLE 3

(Comparative Example)

The same manufacturing procedure as described in Examples 1 or 2 was used, except that raw material was pumped directly into the decanter centrifuge without adding metered water into the feed tube of the decanter. The fat content of solid phase meat obtained in this manner was between 4 to 12% much higher than achieved in Examples 1 or 2. Additionally, the control's fat stream was clearer in color than in Examples 1 or 2, indicating that the undesirable boundary layer, which is colored, was discharged along with the meat fraction.

EXAMPLE 4

Two thousand pounds of mechanically deboned turkey drum meat with an initial fat content of 10% was used as raw material in the process described in Example 1. The resulting defatted meat had a fat content of 0.2 to less than 5%. The process was repeated with mechanically deboned turkey wing meat with a 10% fat content with similar results.

EXAMPLE 5

Two thousands pounds of ground beef having a fat content of approximately 50% was processed as described in Example 1. The fat content of meat isolated in this manner ranged from 2% to 5%.

EXAMPLE 6

The defatted meat obtained from the process described in Example 1 was used to make various fat content bologna including fat free bologna by methods well-known in the art. All fat levels, including fat free bologna, had flavor and sensory qualities comparable with typical low fat bologna.

In addition, the bologna food product made from the defatted meat of Example 1 containing 0.5% fat content, Sample D, was analyzed for myoglobin content and compared to three non-invention bologna products, Samples A, B, and C. The results are provided in Table 5.

TABLE 5

| Sample | % Myoglobin | mg/g Myoglobin |
|---|---|---|
| A. Bologna/Full Fat | 0.011 | 0.11 |
| B. Bologna/Defatted | 0.021 | 0.21 |
| C. Bologna/Defatted | 0.017 | 0.17 |
| D. Invention Defatted Meat | 0.024 | 0.24 |

The results indicate that the bologna prepared using the invention defatted meat has at least as much myoglobin as commercially available bologna products.

While the invention has been described in detail with reference to certain preferred embodiments thereof, it will be understood that modifications and variations are within the spirit and scope of that which is described and claimed.

We claim:

1. A method for defatting meat comprising:

pumping raw meat starting material through a heating means to adjust the temperature of said raw material up to about the live body temperature of the corresponding species, then feeding said raw material into a decanter centrifuge maintained under suitable conditions to form a substantially solid layer of defatted meat, an intermediate boundary layer containing particles of fat, meat and moisture, and a substantially liquid layer of fat by centrifugal separation, and metering liquid into the temperature adjusted raw material entering the centrifuge in an amount sufficient to separate the meat layer from the intermediate boundary layer and the fat layer during centrifugal separation in the centrifuge, then driving the boundary layer from the centrifuge along with the substantially liquid fat layer, and recovering the thus produced defatted meat from the centrifuge.

2. The method according to claim 1, wherein the raw meat starting material has less than about 20% fat.

3. The method according to claim 1, wherein the defatted meat has less than about 10% fat.

4. The method according to claim 1, wherein the defatted meat has less than about 5% fat.

5. The method according to claim 1, wherein the defatted meat has less than about 2% fat.

6. The method according to claim 1, wherein the defatted meat has a protein profile substantially equivalent to the protein profile of the raw meat starting material.

7. The method according to claim 1, wherein the defatted meat is substantially free of denatured protein.

8. The method according to claim 1, wherein the meat layer has a proportional fat composition substantially equivalent to the fat composition of the respective raw meat starting material.

9. The method according to claim 1, wherein the temperature of the raw material is adjusted to within the range of about 85° to no more than 120° F.

10. A defatted meat produced by the process of claim 1.

11. The defatted meat according to claim 10, wherein said defatted meat comprises less than about 2% fat.

12. The defatted meat according to claim 10, wherein said meat product has a protein profile substantially equivalent to the protein profile of the raw meat starting material.

13. The defatted meat according to claim 10, wherein said defatted meat has a proportional fat composition substantially equivalent to the fat composition of the respective deboned raw meat starting material.

14. The defatted meat according to claim 10, wherein the meat is substantially free of denatured protein.

\* \* \* \* \*